Patented Oct. 26, 1937

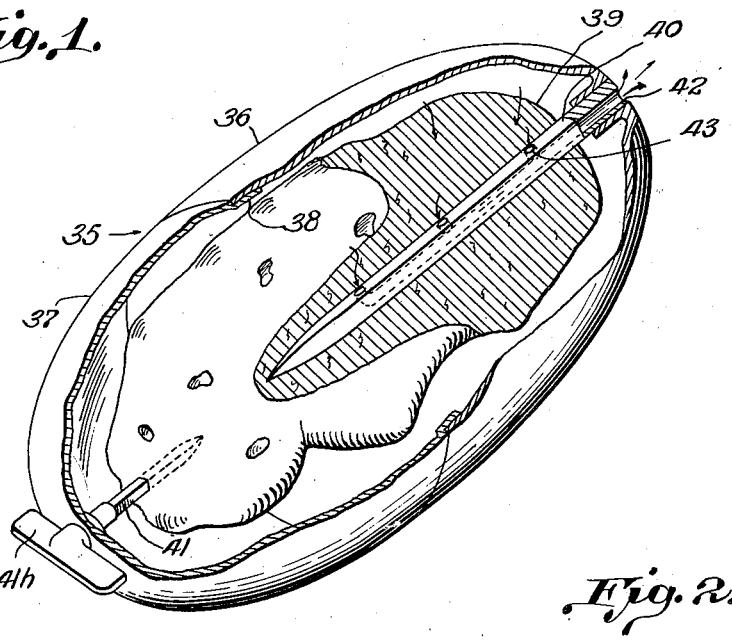
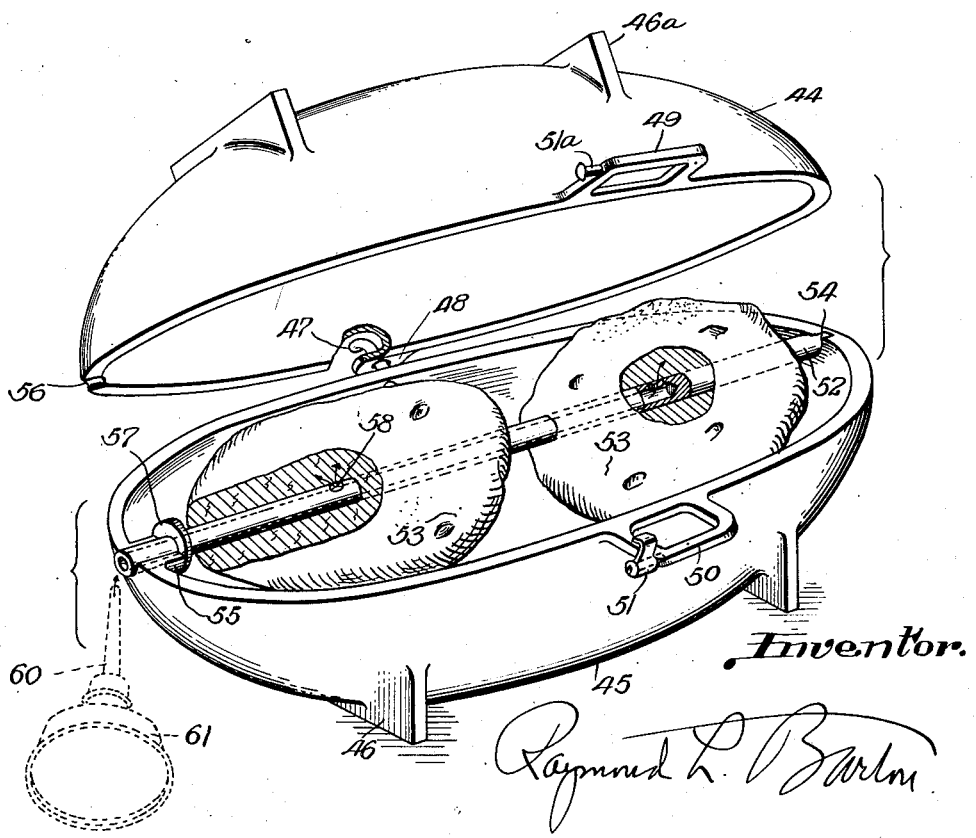

2,096,726

UNITED STATES PATENT OFFICE 2,096,726

BAKING UTENSIL

Raymond L. Barton, Monrovia, Calif.

Application January 19, 1935, Serial No. 2,461

7 Claims. (Cl. 53—6)

This invention pertains to a baking or roasting utensil, and to a method of baking carried out in conjunction therewith.

An important object of the invention is to provide in a device of the above character means for enclosing and cooking vegetables as for example Irish or sweet potatoes, nuts or foodstuff such as corn on the cob whereby the same may be kept free from a heated surface which might otherwise endanger scorching the article being cooked, and at the same time enabling the cooker to be placed in a hot bed of coals or ashes, as might be had at a camp fire, or on a flame without having it contaminated with undesirable outside particles as the case would be if a potato were placed directly into the ashes, in which event it would not be so uniformly cooked.

An important object of the invention is to provide, in a device of the above character, means whereby the article being cooked, as for example a potato, may be treated with seasoning during cooking without opening up the heating compartment of the device.

An important object of the invention is to provide a device in which the article is supported in spaced relation to the sides of the casing being heated and is thereby kept from directly contacting with the inner surface thereof, inversion or other change in the position of said casing not affecting the effective functioning of said means.

An important object of the invention is to provide a casing furnished with food-supporting means which, during operation, is mechanically held against displacement with relation to said casing.

A further important object is to provide a baking enclosure wherein an article may be suspended in spaced relation to the walls of said enclosure and providing the means of support with vents whereby any excess pressure built up in the surrounding area about the article is vented thru the article being cooked.

Also, an important object of the invention is to provide a device which is particularly well adapted for the use of campers for baking articles in an open fire.

Yet another important object of the invention is to provide as an article of manufacture, an unbreakable two-part shell having means for supporting foodstuff inside thereof in spaced relation to its inner walls, having means communicating from the outside wall to the interior of the potato serving the purpose of vent means, means whereby seasoning may be introduced after the potato has become mealy and when the article is baked constituting dishes for two wherein the article may be served.

Many other important objects may be accredited to the invention, but the foregoing will suffice to establish the importance and newness of such an article as a valuable culinary adjunct.

In the drawing containing preferred and modified showings:

Fig. 1 is a perspective view with wall portions of the oven casing broken away to disclose the interior construction, the wall structure as viewed from the side being of an elliptical character.

Fig. 2 shows in perspective a modified two-part casing structure, each part of the casing being utilizable as a serving dish after the cooking operation has been performed.

In Fig. 1 the invention is embodied in a casing 35 which is elliptical as viewed in longitudinal mid-section. This casing is formed in two slightly telescoping sections 36 and 37, the casing section 37 having a shouldered lip 38 which fits within the otherwise open end 38a of the casing section 36. This form of the invention is adapted for baking large potatoes one at a time. A potato 39 is shown supported in spaced relation to the walls of the oven by means of a large spur member 40 at one end and a smaller spur 41 at the other end. The spur 40 has a vent passage 42 therethru and is furnished with lateral vents 43, said vents 42 and 43 allowing the moisture to escape from the interior of the potato being baked. The vents may, should occasion arise, provide egress for excess pressure built up in the area surrounding the potato thru the potato when it is cooked to a porous or floury state.

The exterior portion of the small spur 41 is round to permit it to turn in the bearing provided therefor by that end portion of the casing; but the portion thereof which penetrates the potato is pointed and polygonal in cross section. Said spur 41 has a handle 41h which the cook may grasp and thus test the extent to which the cooking has progressed. If the spur 41 turns easily it indicates that the potato has been softened considerably by the action of the heat thereon, but if the spur resists torsional force it indicates that the potato has not yet become well cooked.

In Fig. 2 is shown a two-part oven casing which is elliptical in all its long diameters, the top part or cover 44 and the basal part 45 having legs 46 and a come apart hinge stud 47 which cooperates with a hinge eye member 48. This separable hinge construction permits a complete separation of the casing sections 44 and 45 for the purpose explained later. Opposite to this hinge construction the cover 44 has a handling loop 49 which cooperates with a like loop 50 of the base section 45, a lock clip 51 cooperating with a stud 51a to lock these loops together when required.

Lengthwise the casing shown in Fig. 4 a tubular axial rod 52 extends to support potatoes 53 or other articles of food of a kind capable of being supported in a similar manner. Said rod 52 is non-rotatably supported, having a pointed end portion 54 which non-rotatably enters a recess provided therefor in one end of the oven section 45. Said end portion is flat where it meets the cover section. The opposite end portion of said rod is supported by a bearing lug 55 a notch 56 being formed in the cover section 44 to make room for the upper part of the shaft at this point. A collar 57 is fixed to rod 52, said collar cooperating with the lug 55 to keep the shaft in its operative position. Shaft 52 is not only of a tubular character to a point near its pointed end, but is furnished with radial ports or vents 58. Olive oil, or other desired liquid dressing, may be introduced into the open end of the shaft 52 or spur 40 from the spout 60 of an oil can 61, thus seasoning the potatoes after they have been baked.

Owing to the rod 52 being pointed at one end it may easily be projected thru the potatoes preparatory to placing them in a position for baking. The spout 60 of the oil can should be small enough to provide for the insertion of its discharge end within the open end of the tubular rod 52 so that the liquid dressing may be forcibly fed into the interior of the potatoes. This may readily be done if the oil can is of the type having its bottom made of resilient springy sheet metal.

In using all the different embodiments of the invention the oven may be inverted after the baking has been partially completed thus insuring a more uniform cooking of the potatoes or other food being baked.

In all the embodiments of the invention portable oven casings are shown intended to be made of materials which will withstand baking temperatures. The two-part oven casing shown in Fig. 4 is furnished with legs 46a in its cover section, and after potatoes, for example, have been baked in this casing, the two parts thereof may be separated and each used for a dining dish. This form of the invention is, therefore, particularly valuable for campers who can employ the device to cook their food over a camp fire and can thereafter use it as container for serving, or as two separate dishes.

I claim:

1. An enclosure for housing foodstuff to be baked, means for supporting said foodstuff in spaced relation to the inside walls of said enclosure, said means being provided with a vent to vent exteriorly the unoccupied area thru the foodstuff being baked when it reaches a porous or mealy state.

2. A potato oven having cooperating prongs whereby the potato is supported in spaced relation to the inner walls of said oven, and vent means for exteriorly venting one of said prongs.

3. A potato roaster comprising parts forming a shell enclosure, means combining said parts as a unit, means for suspending a potato within said shell away from the walls thereof, and means for exteriorly venting the area about the potato thru the potato during the baking thereof.

4. A roaster comprising parts assemblable for housing matter to be baked, and means projecting from the inside wall of said parts for impaling the matter thereon, said means being provided with an opening extending from the outside of said parts and terminating in the portion which projects into the matter.

5. A potato roaster, a prong supported by said roaster for holding the potato away from the sides of said roaster, said prong being provided with vent means whereby seasoning may be injected into the potato while the same is being cooked.

6. In a portable oven construction, an elongated portable oven having a hollow impaling member fixed axially therein and opening out at one end of the oven, said member having lateral outlets to conduct a liquid seasoning substance to the interior of an article of food impaled thereon.

7. In an oven construction, an oven casing, a fixed impaling member mounted upon and within said casing, and a turnable impaling member mounted upon said casing, said members being oppositely positioned to support singly a potato impaled upon and between them, said turnable member having a pointed portion which is polygonal in cross section to penetrate the potato a relative small distance as compared with the fixed impaling member, thereby providing for testing the extent to which the potato has become softened by cooking by twisting, by the application of torsional force to said turnable impaling member.

RAYMOND L. BARTON.